United States Patent
Sha et al.

(10) Patent No.: US 7,843,547 B2
(45) Date of Patent: Nov. 30, 2010

(54) OPTICALLY COMPENSATED BEND MODE LIQUID CRYSTAL DISPLAY DEVICES AND FABRICATION METHODS THEREOF

(75) Inventors: Yi-An Sha, Taipei (TW); Kuo-Chang Lee, Pingtung County (TW); Chih-Chun Hsiao, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 309 days.

(21) Appl. No.: 12/109,310

(22) Filed: Apr. 24, 2008

(65) Prior Publication Data

US 2008/0297672 A1    Dec. 4, 2008

(30) Foreign Application Priority Data

May 29, 2007 (TW) .............................. 96119081 A

(51) Int. Cl.
  *C09K 19/02* (2006.01)
(52) U.S. Cl. ..................................................... 349/169
(58) Field of Classification Search ........................ None
See application file for complete search history.

(56) References Cited

U.S. PATENT DOCUMENTS

| 6,535,259 | B2 | 3/2003 | Lee et al. | |
| 6,853,435 | B2 | 2/2005 | Tanaka et al. | |
| 6,927,825 | B1 | 8/2005 | Koma et al. | |
| 7,369,204 | B1 * | 5/2008 | Choi et al. | 349/141 |
| 2006/0077328 | A1 * | 4/2006 | Jung et al. | 349/128 |

FOREIGN PATENT DOCUMENTS

| TW | I288493 | 10/2007 |
| WO | WO 2005/050754 A1 | 6/2005 |

* cited by examiner

*Primary Examiner*—Sung H Pak

(57) ABSTRACT

The invention relates to optically compensated bend (OCB) mode liquid crystal display devices and fabrication methods thereof. The OCB mode liquid crystal display includes a first substrate, a second substrate and a liquid crystal layer interposed therebetween. A first pixel electrode is disposed on the first substrate. A second pixel electrode is disposed overlying the first pixel electrode with a dielectric layer interposed therebetween such that a discontinuous fringe field is formed at the edge of the second pixel electrode. A first alignment layer is disposed on the first substrate covering the first and second pixel electrode. A common electrode is disposed on the second substrate, and a second alignment layer is disposed on the second substrate covering the common electrode.

22 Claims, 16 Drawing Sheets

OPTICALLY COMPENSATED BEND MODE LIQUID CRYSTAL DISPLAY DEVICES AND FABRICATION METHODS THEREOF

BACKGROUND OF THE INVENTION

1. Field of the Invention

The invention relates to liquid crystal display devices and fabrication methods thereof, and more particularly to optically compensated bend mode liquid crystal display (OCB-LCD) devices and fabrication methods thereof.

2. Description of the Related Art

Liquid crystal display (LCD) devices have several advantages over other display technologies, such as a smaller volume, a lighter weight, and lower power consumption. As such, LCD devices are being applied in a variety of electronic and communication devices including notebook computers, personal digital assistants (PDA), mobile phones and others. Given the trends, technological development of LCD devices are now focusing on lighter and thinner profiles with increased portability.

However, for conventional LCD devices, due to a narrow viewing angle applications have been limited. To improve the viewing angle of LCD devices, multi-domain vertical alignment (MVA) mode LCD devices comprising of bumps or protrusions on substrate for creating different orientations of liquid crystal molecules have been introduced. Nonetheless, different liquid crystal orientations can cause electric field changes in a single liquid crystal cell, changes in liquid crystal alignment and changes in liquid crystal relaxation. In addition, forming bumps or protrusions on substrate requires a complex lithographic process utilizing a half-tone mask.

Another conventional method for improving the viewing angle of LCD devices is provided by changing orientations of liquid crystal molecules to achieve self-compensated viewing angles. This method improves response speed and widens viewing angles of LCD devices.

U.S. Pat. No. 6,853,435, the entirety of which is hereby incorporated by reference, discloses an optically compensated bend mode liquid crystal display (OCB-LCD) device with fast response speed and wide viewing angles. Since the display mode requires transition from a splay mode to a bend mode by switching, the transition time takes from several seconds to several minutes. Thus, in order to reduce the transition time, protrusion structures are disposed on the lower substrate, resulting in changes of the electric flux lines and thereby dramatically reducing transition time.

FIG. 1 is a cross section of a conventional OCB-LCD device. Referring to FIG. 1, a conventional OCB-LCD device 100 includes a first substrate 108 and a second substrate 101 opposing to each other and with a spacer 105 interposed therebetween. A pixel electrode 107 is disposed on the first substrate 108, and a lower alignment layer is disposed on the pixel electrode 107. A common electrode 102 is disposed on the second substrate 101. An upper alignment layer 103 is disposed on the common electrode 102. A liquid crystal fills the gap between the first substrate 108 and the second substrate 101. Protrusion structures 110 are formed on the lower substrate of the conventional OCB-LCD device 100 resulting in changes of the electric flux lines such that the transition time is dramatically decreased.

U.S. Pat. No. 6,535,259, the entirety of which is hereby incorporated by reference, discloses another OCB-LCD device with pixel fringe regions between two adjacent pixels. Liquid crystal molecules within pixel fringe regions are dominated by two fringe fields, resulting in unstable liquid crystal distribution and increased transition. Furthermore, by using additional protrusion structures on the lower substrate and the abovementioned boundary conditions, inclinations of the liquid crystal molecules are stabilized.

FIG. 2 is a cross section of another conventional OCB-LCD device. Referring to FIG. 2, a conventional OCB-LCD device includes a first substrate 220 and a second substrate 210 opposing to each other and with a specific gap therebetween. The first substrate is an active substrate with date lines 221 and active devices 222 such as thin film transistors (TFTs) thereon. A passivation layer 223 is formed overlying the first substrate 220 covering the date lines 221 and active devices 222. Protrusion structures 226 are formed on the data lines 221. A pixel electrode 225 is disposed on the first substrate 220 and electrically connected to the active devices 222. A first alignment layer 241 is disposed on the first substrate. After rubbed along the rubbing direction R, the surface of the first alignment layer 241 creates an anchor force against and inclining the LC molecules.

The second substrate 210 is a color filter (CF) substrate with color filters 203 corresponding to each sub-pixels and a black matrix layer 202 among the color filters 203. A common electrode 204 is disposed on the color filters 203 and black matrix layer 202. A second alignment layer 242 is formed on the common electrode 204 of the second substrate 210. After rubbed along the rubbing direction R, the surface of the second alignment layer 242 creates an anchor force against and inclining the LC molecules. A liquid crystal layer 230 fills gap between the first substrate 220 and the first substrate 210. Protrusion structures 226 of the TFTs 222 and data lines 221 on the lower substrate of the conventional OCB-LCD device 100 can result in changes of the electric flux lines such that the transition time is dramatically reduced.

Moreover, another method to improve transmittance of the conventional OCB-LCD devices is disclosed to change driving pixel electrodes by observing mechanisms of the splay-to bend (S-B) transition. For example, Samsung Electronics in 2006 annual conference of the society for information display (SID) discloses an OCB-LCD device with effectively 20% brightness improvement revealed from applied voltage vs. transmittance characteristics. Furthermore, Chunghwa Picture Tubes, LTD. in 2006 annual conference of the society for information display (SID) discloses that by changing rubbing direction, transmittance and brightness of the OCB-LCD devices can be improved.

U.S. Pat. No. 6,927,825, the entirety of which is hereby incorporated by reference, further discloses an OCB-LCD device. The splay-to-bend (S-B) transition can be access rated by reducing interval between pixel regions. In order to fulfill high S-B transition, fast response, and high brightness, the pre-tilt angles of liquid crystal molecules are approximately in a range of 1.2° to 3°.

BRIEF SUMMARY OF THE INVENTION

A detailed description is given in the following embodiments with reference to the accompanying drawings.

An exemplary embodiment of the invention provides an optically compensated bend (OCB) mode liquid crystal display device, comprising: a first substrate opposite a second substrate with a layer of liquid crystal molecules interposed therebetween; a first pixel electrode disposed on the first substrate; a second pixel electrode overlying the first pixel electrode with a dielectric layer interposed therebetween such that a discontinuous electrical field region is generated at the fringe of the second pixel electrode; a first alignment layer disposed on the first substrate covering the first and the second pixel electrodes; a common electrode disposed on the second substrate; and a second alignment layer disposed on the second substrate covering the common electrode.

Another exemplary embodiment of the invention provides an optically compensated bend (OCB) mode liquid crystal display device, comprising: a first substrate opposite a second substrate with a layer of liquid crystal molecules interposed therebetween; a first pixel electrode disposed on the first substrate; a second pixel electrode disposed on the first pixel electrode generating a discontinuous electrical field region; a first alignment layer disposed on the first substrate covering the first and the second pixel electrodes; a common electrode disposed on the second substrate; and a second alignment layer disposed on the second substrate covering the common electrode.

Another exemplary embodiment of the invention provides an optically compensated bend (OCB) mode liquid crystal display device, comprising: a first substrate opposite a second substrate with a layer of liquid crystal molecules interposed therebetween; a plurality of pixel electrodes disposed on the first substrate, wherein an interval is interposed between two adjacent pixel electrodes, thereby generating a discontinuous electrical field region; a first alignment layer disposed on the first substrate covering the plurality of pixel electrodes; a common electrode disposed on the second substrate; and a second alignment layer disposed on the second substrate covering the common electrode.

Embodiments of the invention also provide a method for fabricating an optically compensated bend (OCB) mode liquid crystal display device, comprising: forming a first pixel electrode on a first substrate; forming a second pixel electrode overlying the first pixel electrode such that a discontinuous electrical field region is generated at the fringe of the second pixel electrode; forming a first alignment layer on the first substrate covering the first and the second pixel electrodes; forming a common electrode disposed on the second substrate; forming a second alignment layer disposed on the second substrate covering the common electrode; assembling the first and the second substrates; filling a liquid crystal layer between the first and the second substrates; and sealing the liquid crystal layer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide an optically compensated bend mode liquid crystal display (OCB-LCD) device capable of fulfilling high transmittance, fast response time and wide viewing angles by patterning pixel electrodes creating fringe fields at boundaries therebetween.

Some exemplary embodiments of the invention provide OCB-LCD devices with patterned pixel electrodes creating fringe fields at boundaries therebetween. A patterned pixel electrode is formed on a lower substrate (e.g. an active device matrix substrate). Dimensions and shapes of the patterned pixel electrode are not limited and are dependent from the desirable fringe fields. A common electrode is then formed on the upper substrate (e.g. a color filter substrate). After assembling the lower and upper substrates and filling the liquid crystal layer, the OCB-LCD device is achieved. Since the fringe fields generated by the patterned pixel electrode can facilitate inclination of the liquid crystal molecules, transmittance can therefore improved.

The factors effecting response time of liquid crystal molecules of the OCB-LCD devices include viscosity of liquid crystal, dielectric constant of the liquid crystal, elastic modulus of the liquid crystal, and back flow effect of rotation of the liquid crystal. During switching of the OCB-LCD device, motions of liquid crystal molecules are symmetrical bending. Since tiny back flow effect is generated during driving rotation of LC molecules, fast response time can be achieved. The OCB-LCD device displays while rotating LC molecules on are on bend mode to regulate transmittance. Phase differences resulted from rotating LC molecules on bend mode are not significant, however, transmittance and contrast ratio of the OCB-LCD device are typically low. Therefore, embodiments of patterned pixel electrode structure of the invention can create fringe fields and effectively improve both transmittance and contrast ratio of the OCB-LCD device.

Figure 1:
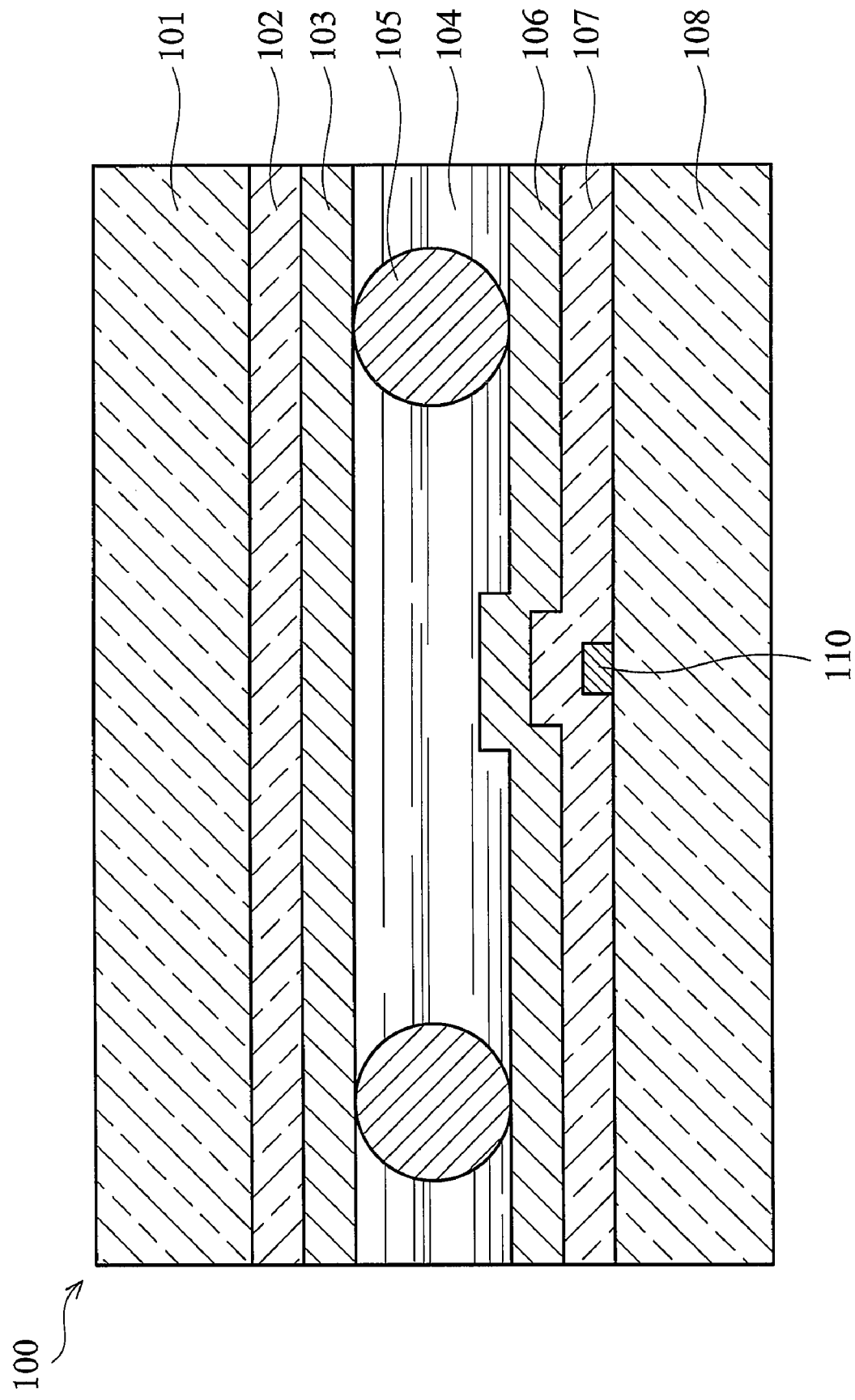
FIG. 1 is a cross section of a conventional OCB-LCD device.
Figure 2:
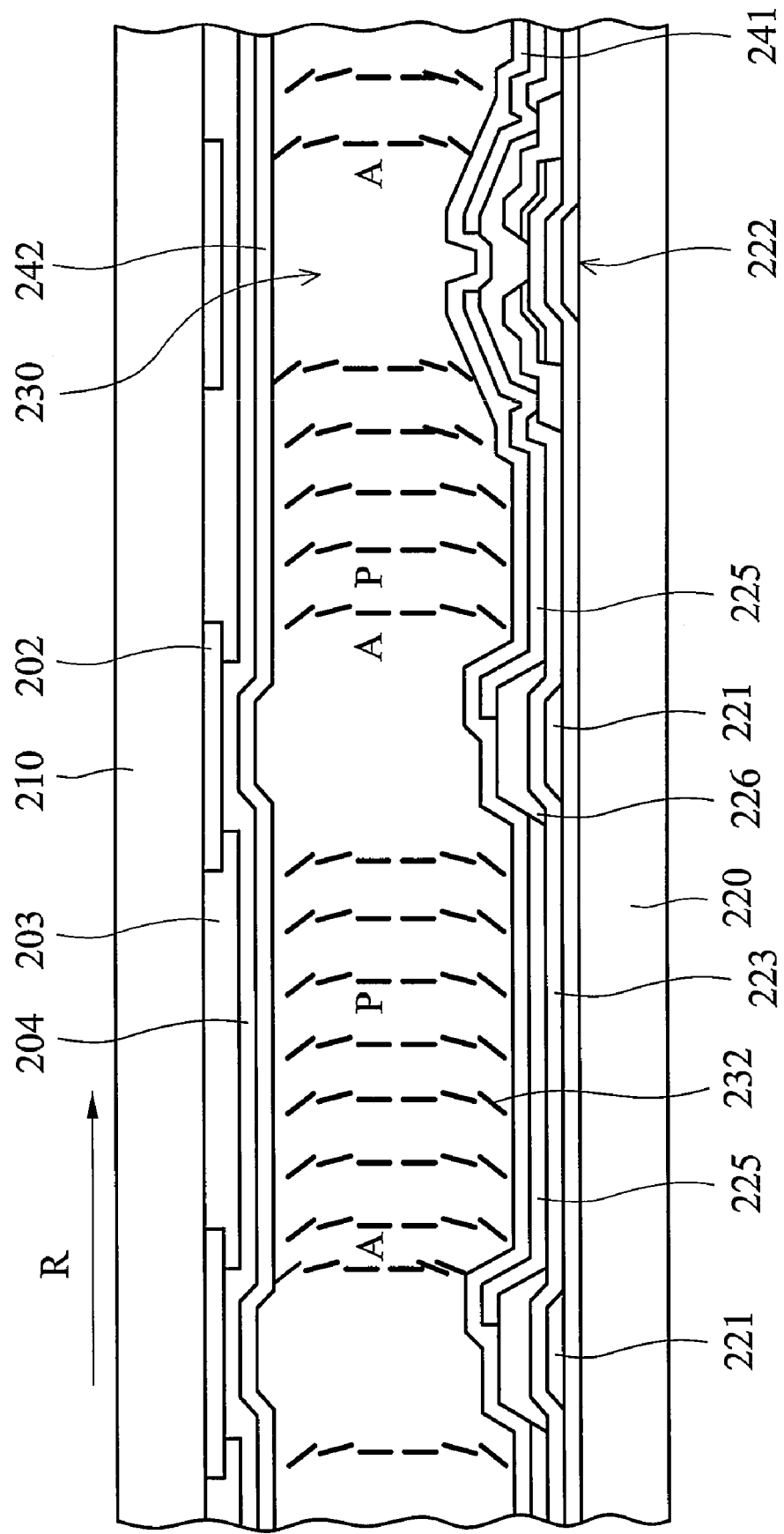
FIG. 2 is a cross section of another conventional OCB-LCD device.
Figure 3A:
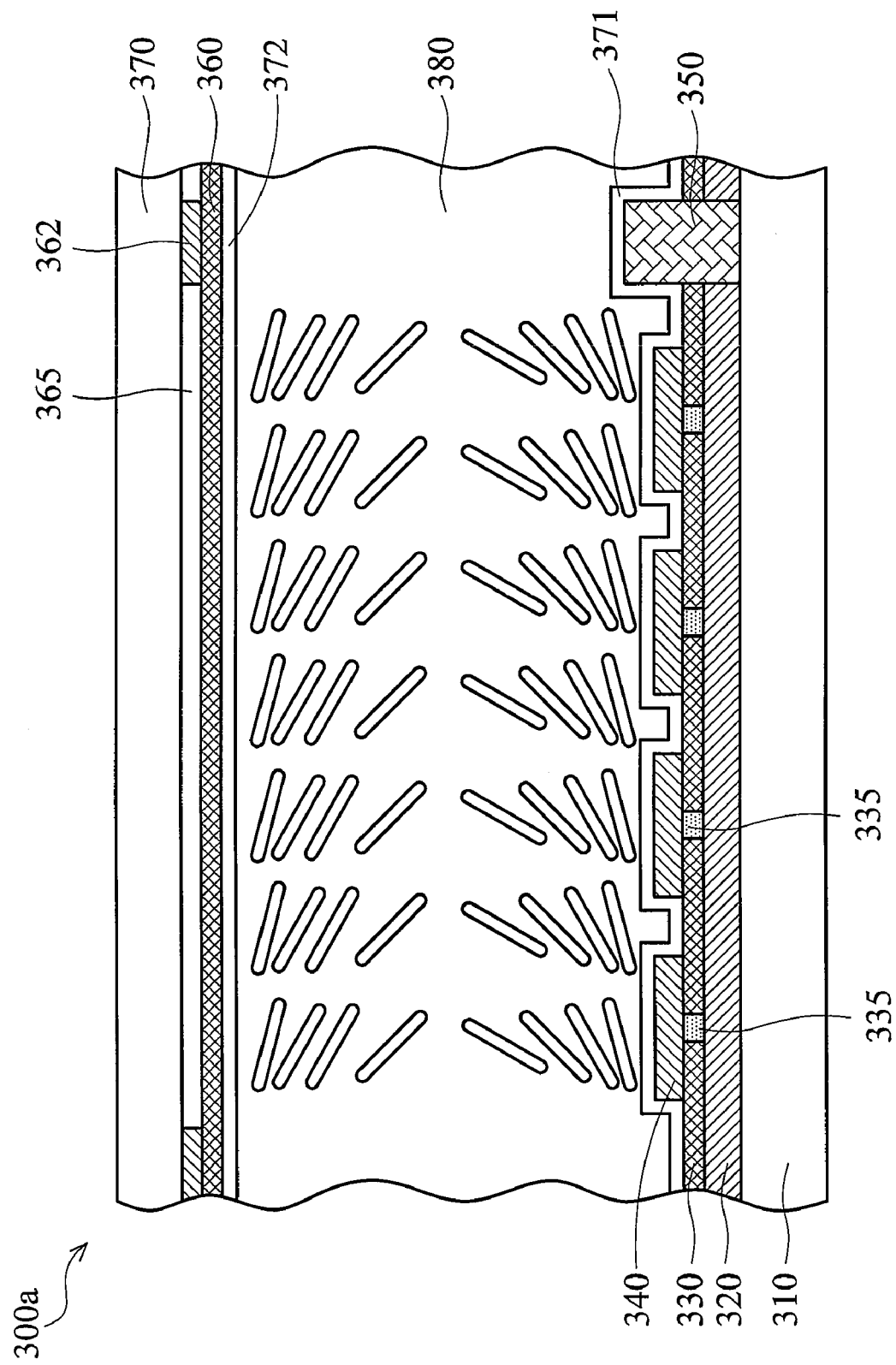
FIG. 3A is a cross section of an embodiment of an OCB-LCD device of the invention.

FIG. 3A is a cross section of an embodiment of an OCB-LCD device of the invention. Referring to FIG. 3A, an OCB-LCD device 300a includes a first substrate 310 and a second substrate 370 opposing to each other and a liquid crystal layer 380 interposed therebetween. The first substrate 310 such as an active substrate includes active devices 350 corresponding to each pixel of the OCB-LCD device 300a respectively. The second substrate 370 such as a color filter (CF) substrate includes color filters 365 corresponding to each sub-pixels and a black matrix layer 362 among the color filters 365. A first pixel electrode 320 is disposed on the first substrate 310. A second pixel electrode 340 is formed overlying the first pixel electrode 320 with a dielectric layer 330 interposed therebetween such that a discontinuous electrical field region is generated at the fringe of the second pixel electrode 340. The first pixel electrode 320 and the second pixel electrode 340 are electrically connected through a conductive plug 335. The shape of the second electrode 340 comprises a striped, square, zigzagged, serpentine, polygonal, or circular. A first alignment layer 371 is disposed on the first substrate covering the first pixel electrode 320 and the second pixel electrode 340.

A common electrode 360 is disposed on the second substrate 370. The covered region of the common electrode 360 is greater than or equal to the first pixel electrode 320. Further, the shape of the common electrode 360 comprises a striped, square, zigzagged, serpentine, polygonal, or circular. A second alignment layer 372 is formed on the common electrode 360 of the second substrate 370.

Note that embodiments of the invention further include rubbing the first alignment layer 371 and the second alignment layer 372 along a rubbing oriented direction. The rubbing oriented direction is substantially unparallel to the second pixel electrode 340 or the common electrode 360. Alternatively, the rubbing oriented direction is substantially perpendicular to the second pixel electrode 340 or the common electrode 360. An included angle between the rubbing oriented direction and the second pixel electrode 340 is between about 80° to 100°, or an included angle between the oriented direction and the second pixel electrode 340 is between about 80° to 100°. Furthermore, the first alignment layer 371 is rubbed along a first oriented direction, and the second alignment layer 372 is rubbed along a second oriented direction. An included angle between the first oriented direction and the second oriented direction is between about 0° to 20°.

When a voltage is applied to the OCB mode liquid crystal display device, the discontinuous electrical field region has a dual mode transition boundary and has a locally high transparency region. The dual mode transition boundary is a splay-to-bend mode transition boundary. Moreover, a discontinuous electrical field is generated at the fringe of the first pixel electrode resulting in a locally high transparency region, and a discontinuous electrical field is generated at the fringe of the second pixel electrode resulting in a locally high transparency region.

Figure 3B:
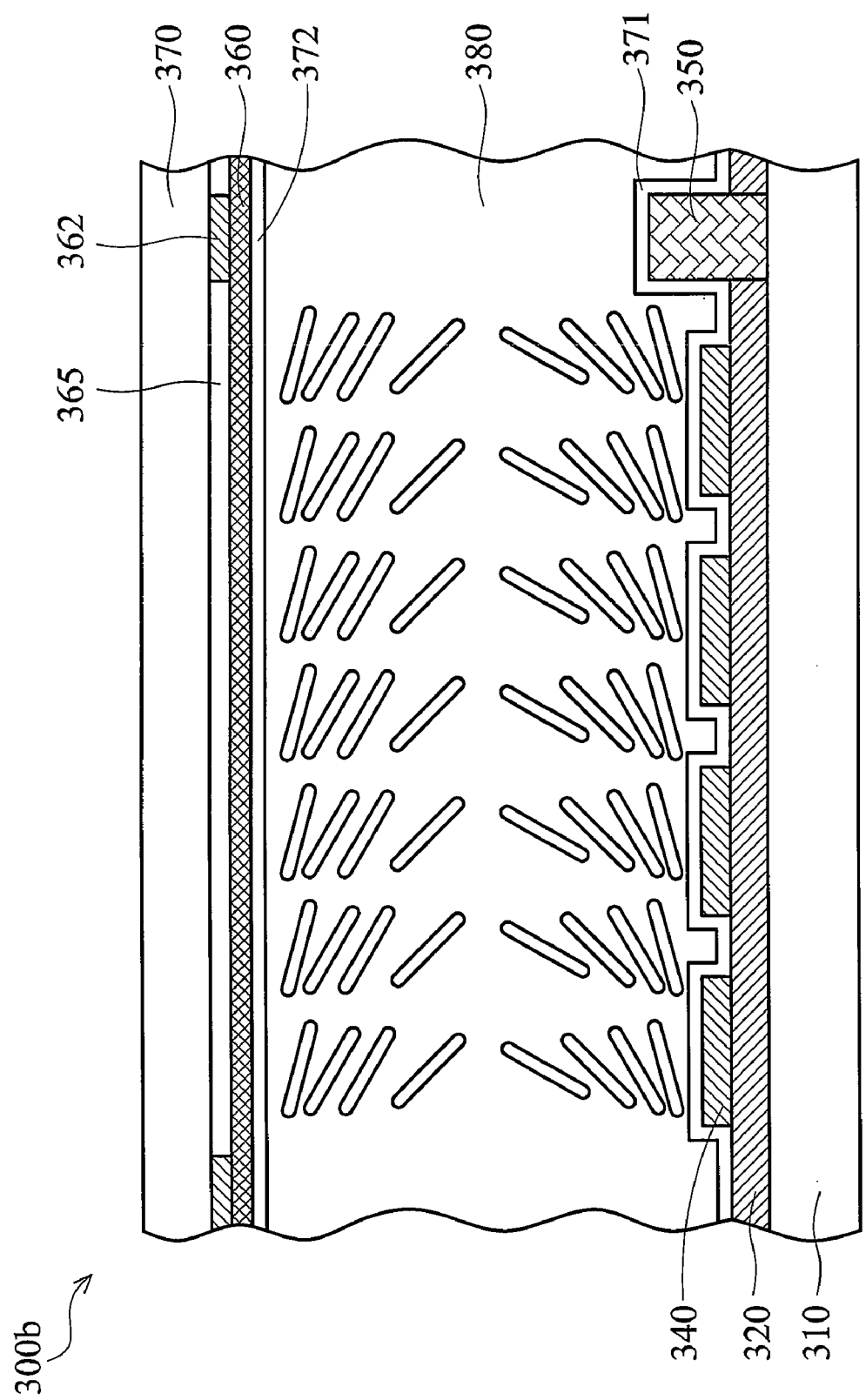
FIG. 3B is a cross section of another embodiment of an OCB-LCD device of the invention.

FIG. 3B is a cross section of another embodiment of an OCB-LCD device of the invention. Referring to FIG. 3B, an OCB-LCD device 300b includes a first substrate 310 and a second substrate 370 opposing to each other and a liquid crystal layer 380 interposed therebetween. The first substrate 310 such as an active substrate includes active devices 350 corresponding to each pixel of the OCB-LCD device 300b respectively. The second substrate 370 such as a color filter (CF) substrate includes color filters 365 corresponding to each sub-pixels and a black matrix layer 362 among the color filters 365. A first pixel electrode 320 is disposed on the first substrate 310. A second pixel electrode 340 is formed on the first pixel electrode 320 such that a discontinuous electrical field region is generated at the fringe of the second pixel electrode 340. The shape of the second electrode 340 comprises a striped, square, zigzagged, serpentine, polygonal, or circular. A first alignment layer 371 is disposed on the first substrate covering the first pixel electrode 320 and the second pixel electrode 340.

A common electrode 360 is disposed on the second substrate 370. The covered region of the common electrode 360 is greater than or equal to the first pixel electrode 320. Further, the shape of the common electrode 360 comprises a striped, square, zigzagged, serpentine, polygonal, or circular. A second alignment layer 372 is formed on the common electrode 360 of the second substrate 370.

Note that the rubbing oriented direction of the OCB-LCD device 300b is substantially the same as that of the OCB-LCD device 300a in FIG. 3A, and for brevity, its detailed description is omitted herein.

Figure 3C:
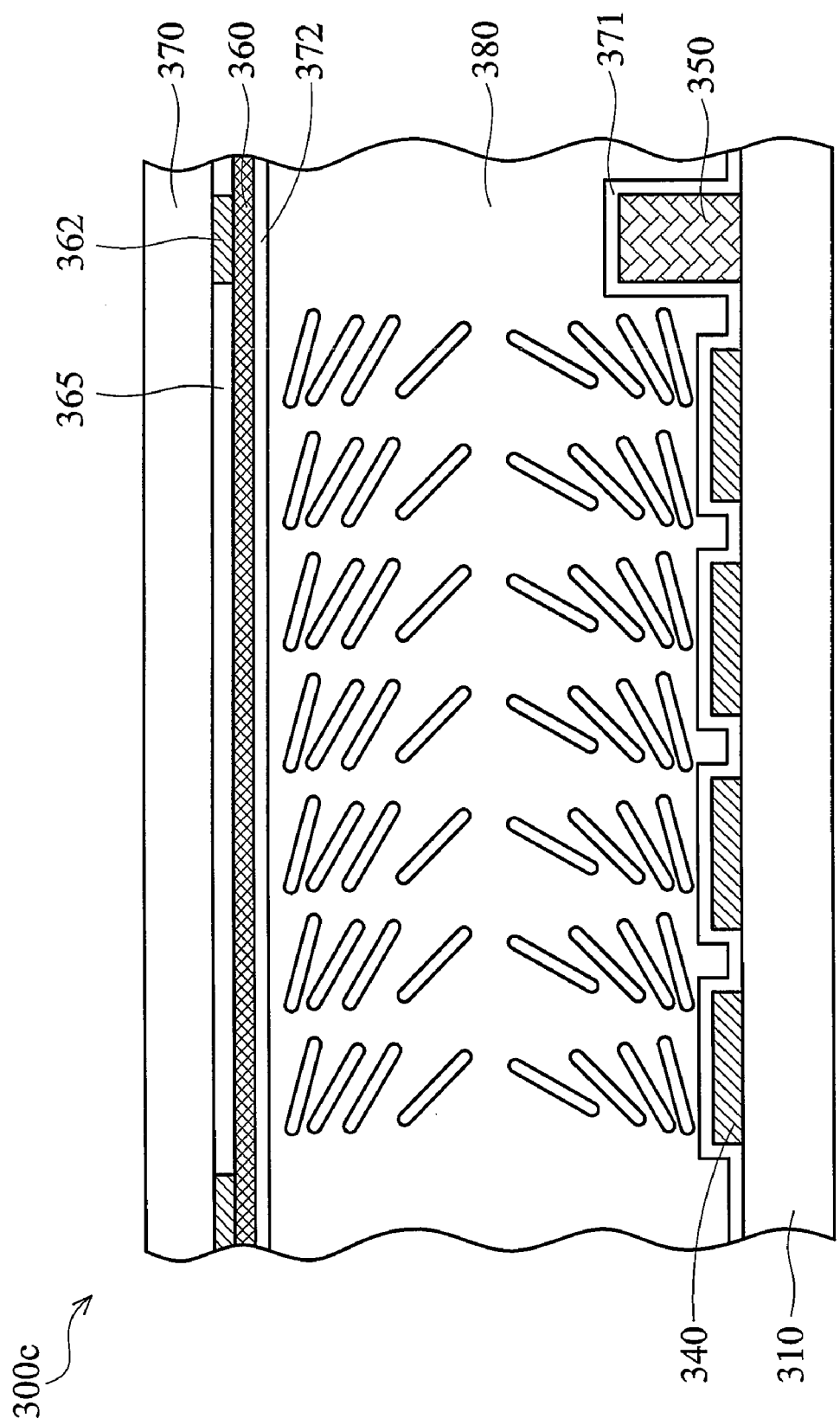
FIG. 3C is a cross section of another embodiment of an OCB-LCD device of the invention.

FIG. 3C is a cross section of another embodiment of an OCB-LCD device of the invention. Referring to FIG. 3C, an OCB-LCD device 300c includes a first substrate 310 and a second substrate 370 opposing to each other and a liquid crystal layer 380 interposed therebetween. The first substrate 310 such as an active substrate includes active devices 350 corresponding to each pixel respectively. The second substrate 370 such as a color filter (CF) substrate includes color filters 365 corresponding to each sub-pixels and a black matrix layer 362 among the color filters 365. A pixel electrode 340 is disposed on the first substrate 310 such that a discontinuous electrical field region is generated at the fringe of the pixel electrode 340. The shape of the electrode 340 comprises a striped, square, zigzagged, serpentine, polygonal, or circular. A first alignment layer 371 is disposed on the first substrate covering the pixel electrode 340.

A common electrode 360 is disposed on the second substrate 370. The covered region of the common electrode 360 is greater than or equal to the first pixel electrode 320. Further, the shape of the common electrode 360 comprises a striped, square, zigzagged, serpentine, polygonal, or circular. A second alignment layer 372 is formed on the common electrode 360 of the second substrate 370.

Note that the rubbing oriented direction of the OCB-LCD device 300c is substantially the same as that of the OCB-LCD device 300a in FIG. 3A, and for brevity, its detailed description is omitted herein.

An aspect of the invention provides a novel OCB-LCD structure in which pixel electrodes corresponding to active devices (e.g., a thin film transistor (TFT)) is formed and configured as strip/overall electrode configurations, such as a fringe field generated at the boundaries of the pixel electrode. The inclination angles of liquid crystal molecules can thus increase without deteriorating response time, thereby resulting in high transmittance of the OCB-LCD device.

Figure 4A:
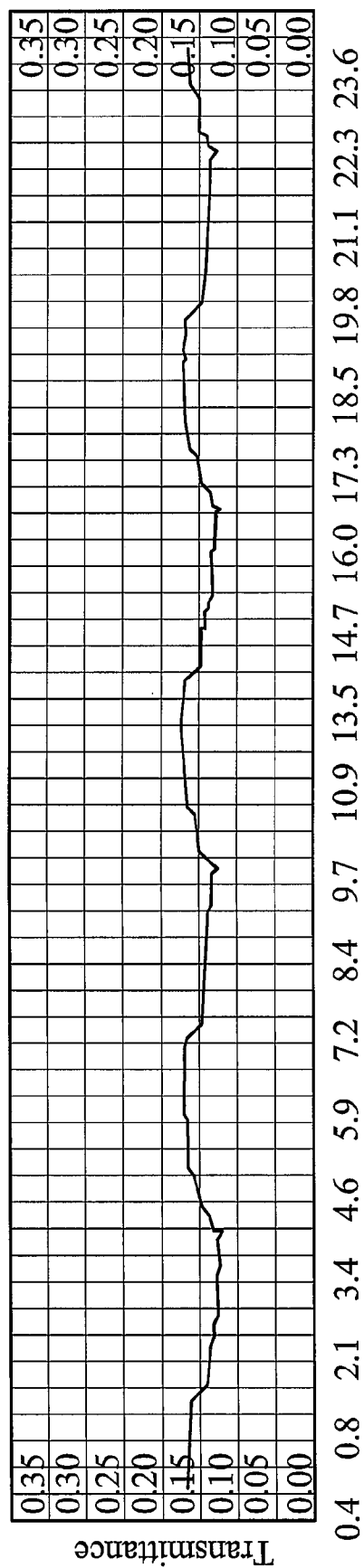
FIGS. 4A-4C show simulated results of optical characteristics of the OCB-LCD devices according to embodiments of the invention.
Figure 4B:
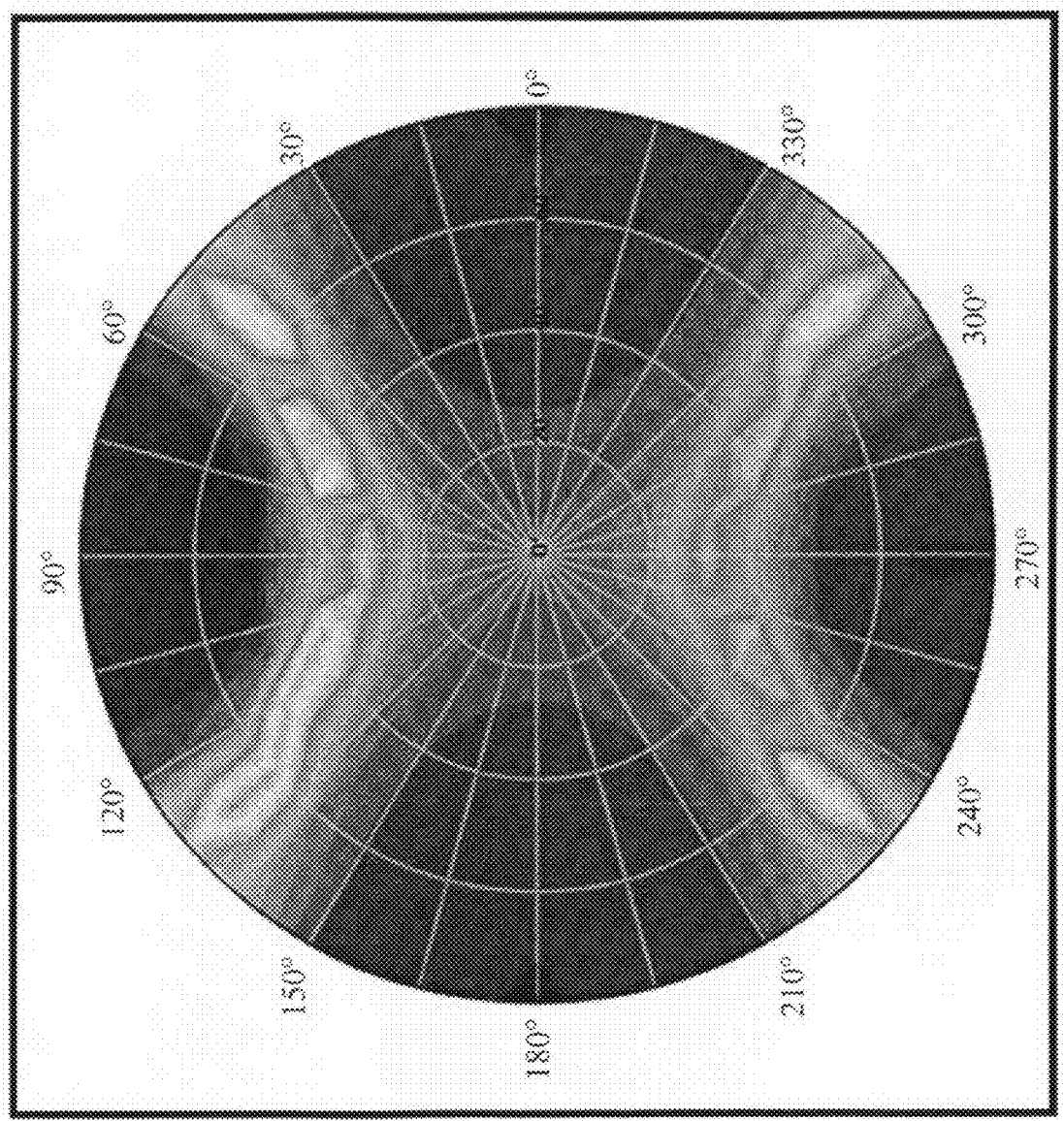
Figure 4C:
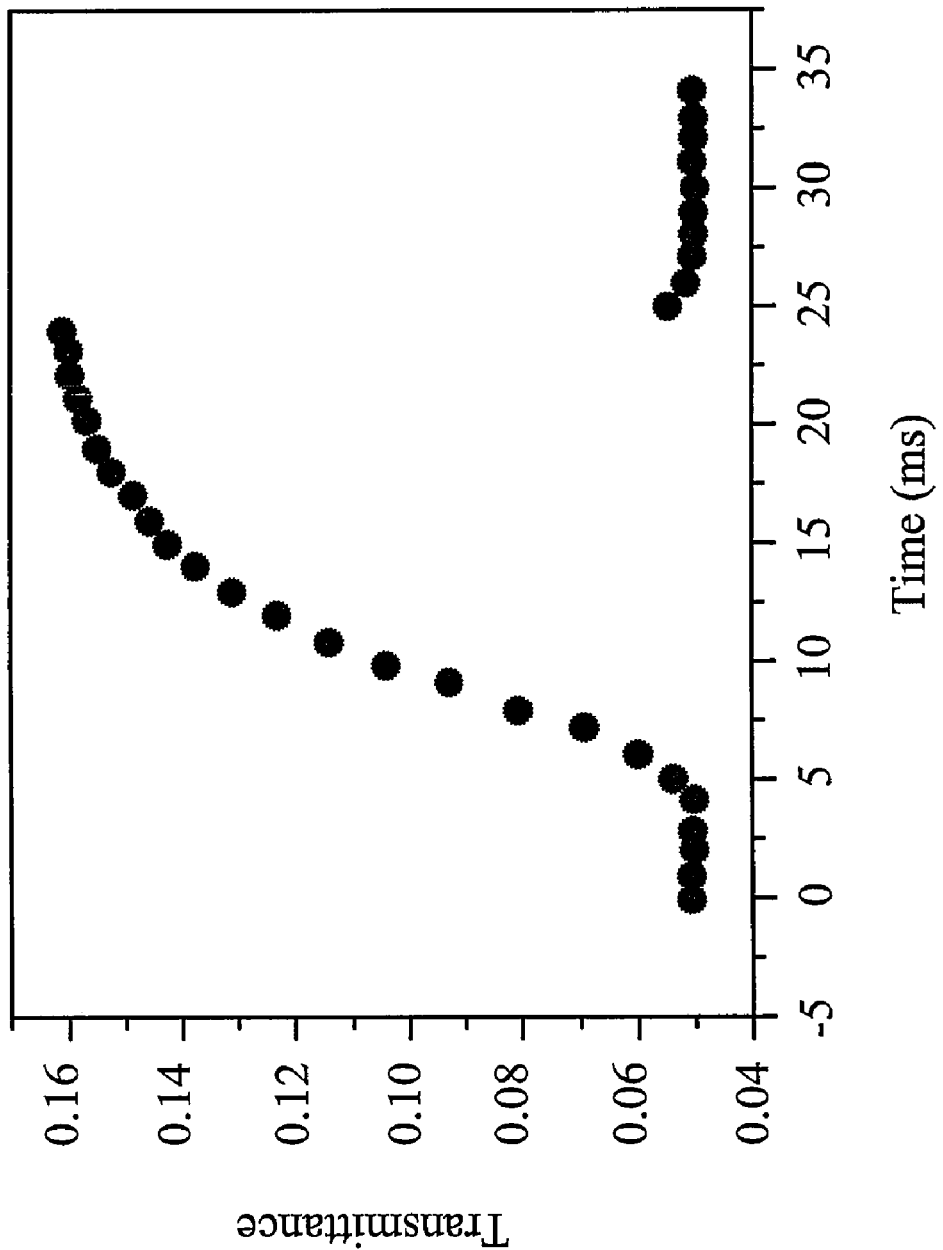

FIGS. 4A-4C show simulated results of optical characteristics of the OCB-LCD devices according to embodiments of the invention. The liquid crystal of the OCB-LCD was selected from a commercially available model (MJ-05128). The pre-tilt angle of the liquid crystal layer was controlled at about 4°, and the gap of the liquid crystal layer was about 4 µm. The pixel electrode was a stripe pixel electrode with line width of about 5 µm. The interval between each stripe pixel electrode was about 2 µm. The dielectric layer was made from silicon oxide ($SiO_x$) with thickness of about 1000 Å. Referring to FIG. 4A, a discontinuous electrical field is generated at the fringe of the first pixel electrode resulting in a locally high transparency region, and a discontinuous electrical field is generated at the fringe of the second pixel electrode resulting in a locally high transparency region. At a bright state, dependency between transmittance and distribution of the stripe pixel electrode is illustrated in FIG. 4A. Transmittance was typically at the fringes of the stripe pixel electrode. Since the structure of the pixel electrode is designed into striped pattern, the pre-tilt angle of the liquid crystal molecules on the lower substrate was greater than those on the un-patterned common electrode of the upper substrate. Furthermore, the pre-tilt angle of the liquid crystal molecules was greater, when greater phase difference was generated. The transmittance of the OCB-LCD panel was improved approximately 15%. The contrast ratio with azimuthal view angle diagram is shown in FIG. 4B. The relationship between transmittance of the OCB-LCD device and the response time is shown in FIG. 4C. The response time was about 4 ms.

Figure 5A:
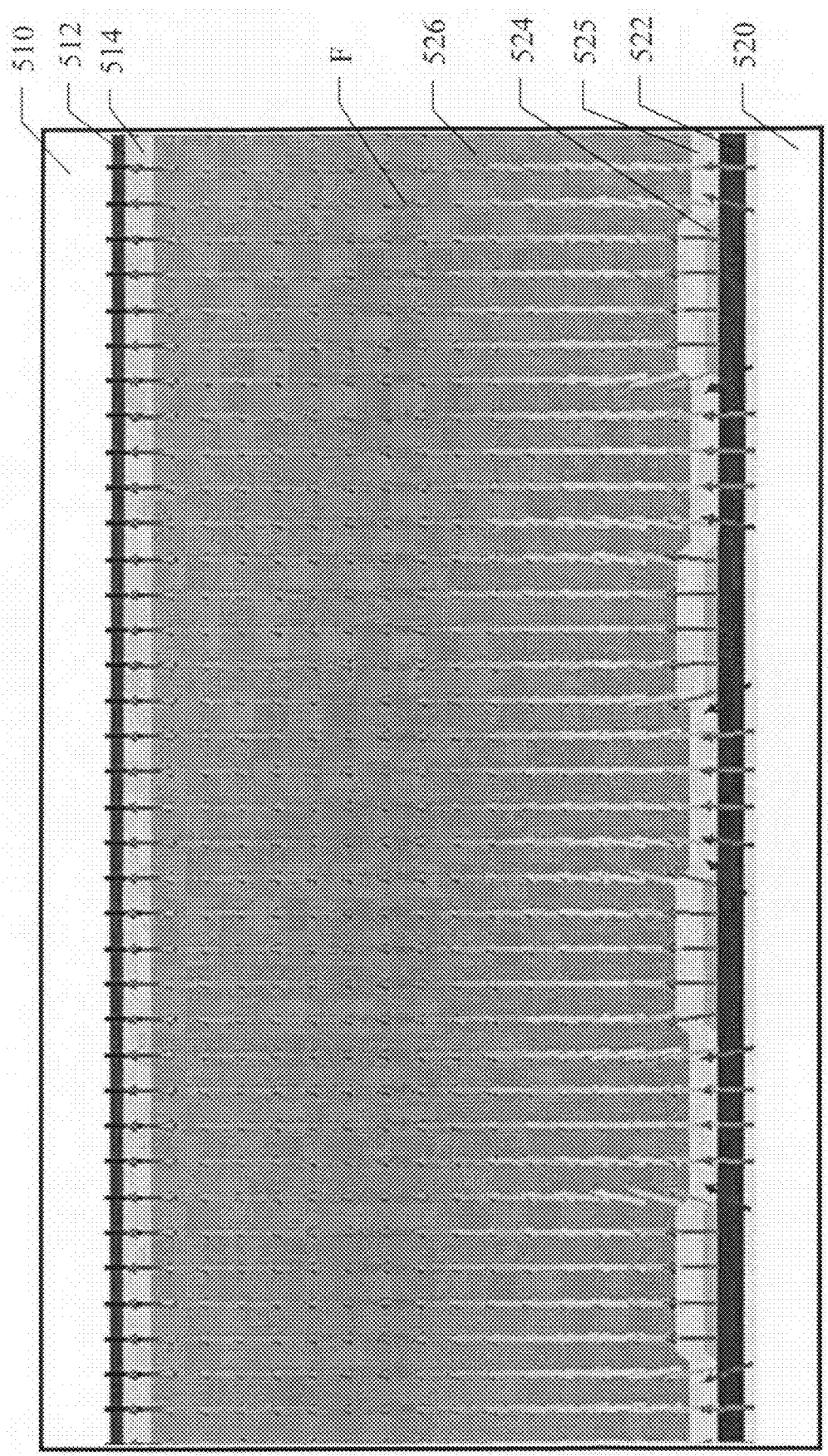
FIG. 5A is a schematic view illustrating inside electrical field distribution of the OCB-LCD devices according to embodiments of the invention.
Figure 5B:
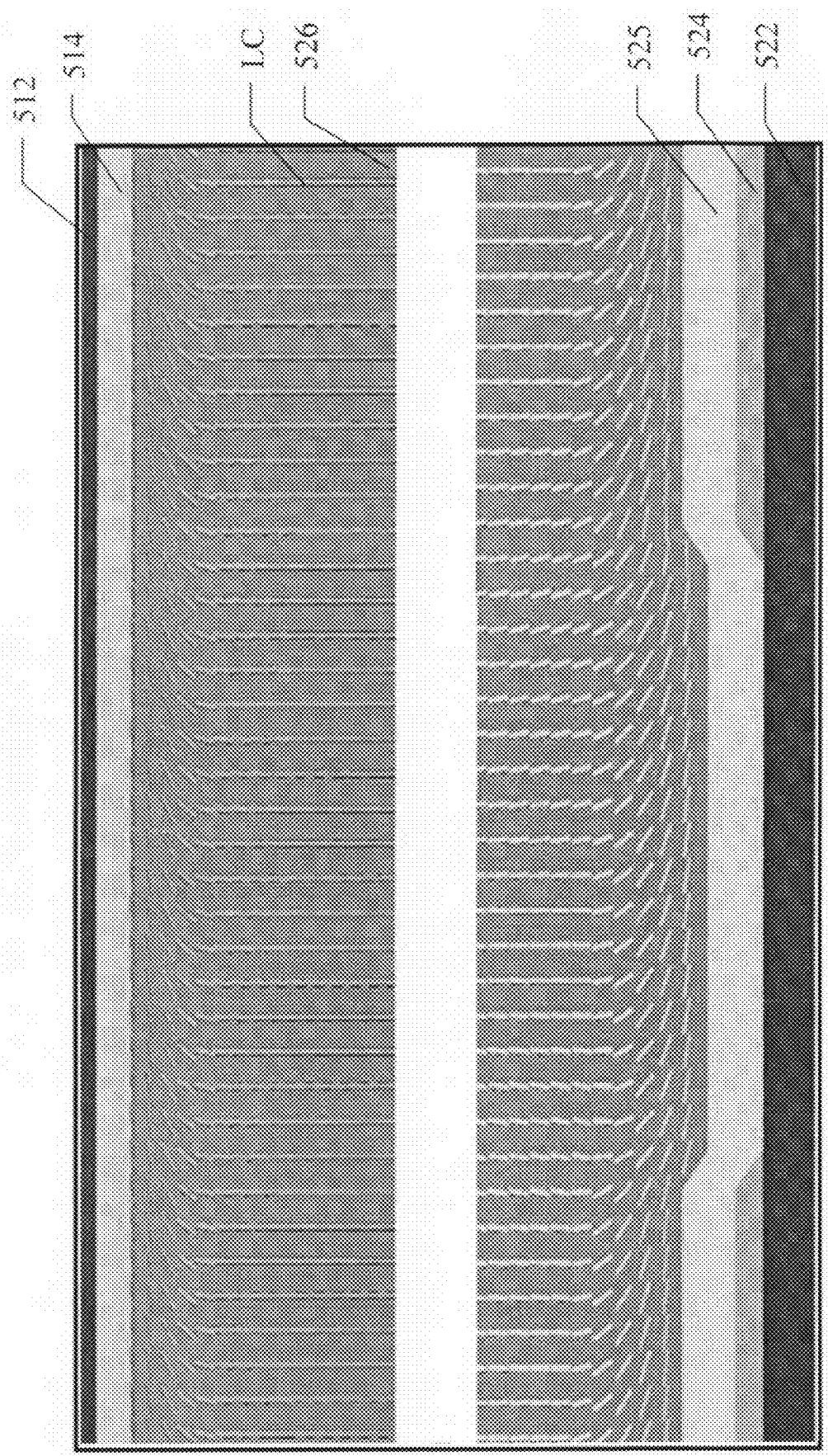
FIG. 5B is a schematic view illustrating distribution of LC molecules of the LC layer near the edges of the patterned striped pixel electrodes of the OCB-LCD devices according to embodiments of the invention.

FIG. 5A is a schematic view illustrating inside electrical field distribution of the OCB-LCD devices according to embodiments of the invention. In FIG. 5A, an OCB-LCD device includes a first pixel electrode 520 disposed on a substrate (not shown). A dielectric layer 522 is disposed on the first pixel electrode 520, and a second pixel electrode 524 is disposed on the dielectric layer 522. A first alignment layer 525 is disposed overlying the substrate. A second alignment layer 514 is disposed on the opposing substrate 510 covering the common electrode 512. A discontinuous electric field is generated at fringes of the second pixel electrode 524 resulting in un-uniform distribution of the electrical flux F. When a voltage is applied to the OCB mode liquid crystal display device, the discontinuous electrical field region has a dual mode transition boundary and has a locally high transparency region. FIG. 5B is a schematic view illustrating distribution of LC molecules of the LC layer 526 near the edges of the patterned striped pixel electrodes of the OCB-LCD devices according to embodiments of the invention. The structure of the pixel electrode is designed into striped pattern. The electrode on the upper substrate is an overall common electrode. The rubbing process is controlled. The liquid crystal layer is a positive type liquid crystal. Since the pixel electrode on the lower substrate is stripe, fringe field effect exists at the boundaries of the pixel electrode such that after the liquid crystal molecules are affected by the fringe field, the liquid crystal molecules become more tilted resulting in higher transmittance.

Figure 6A:
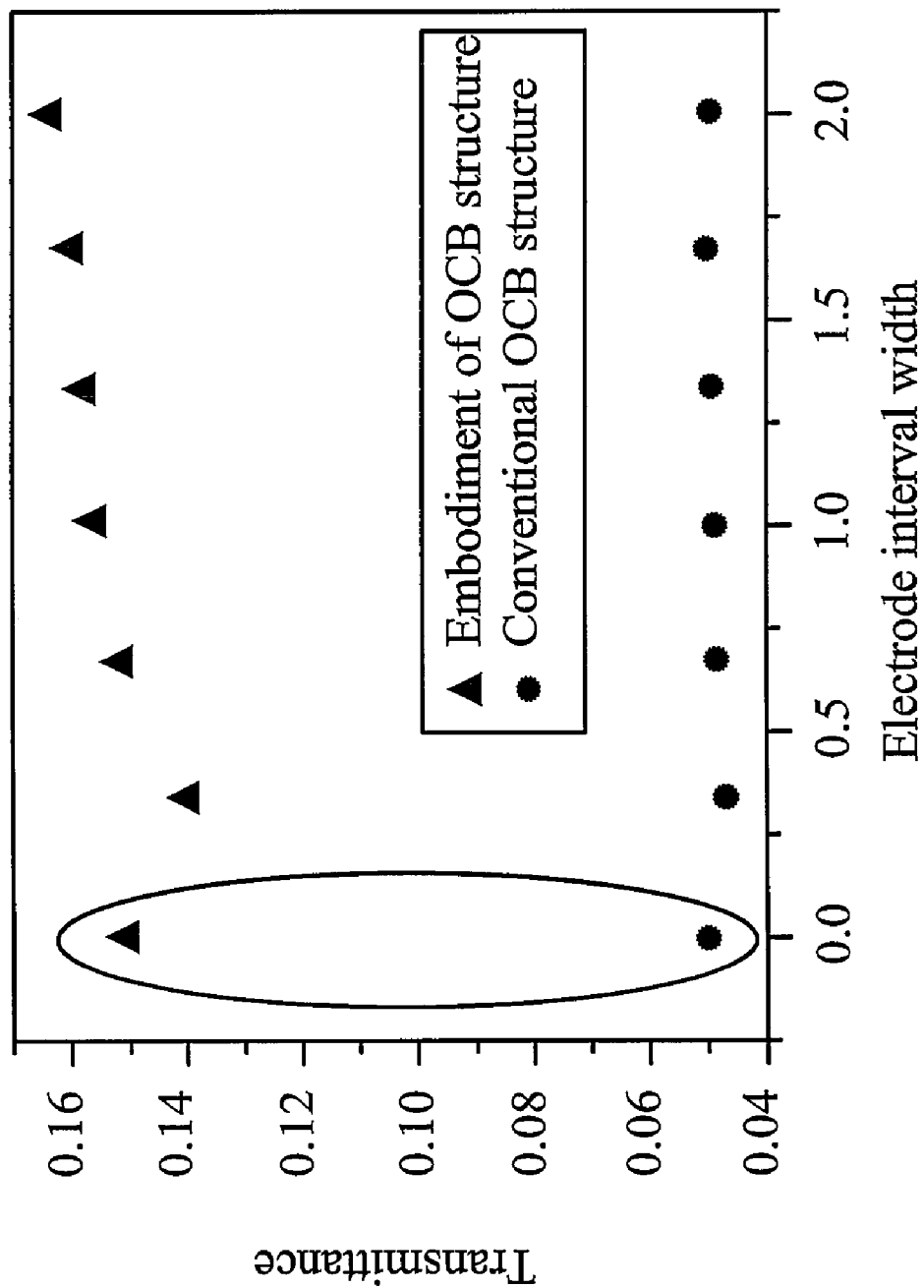
FIG. 6A is a diagram illustrating transmission comparison between a conventional OCB-LCD structure and an embodiment of the OCB-LCD structure of the invention.
Figure 6B:
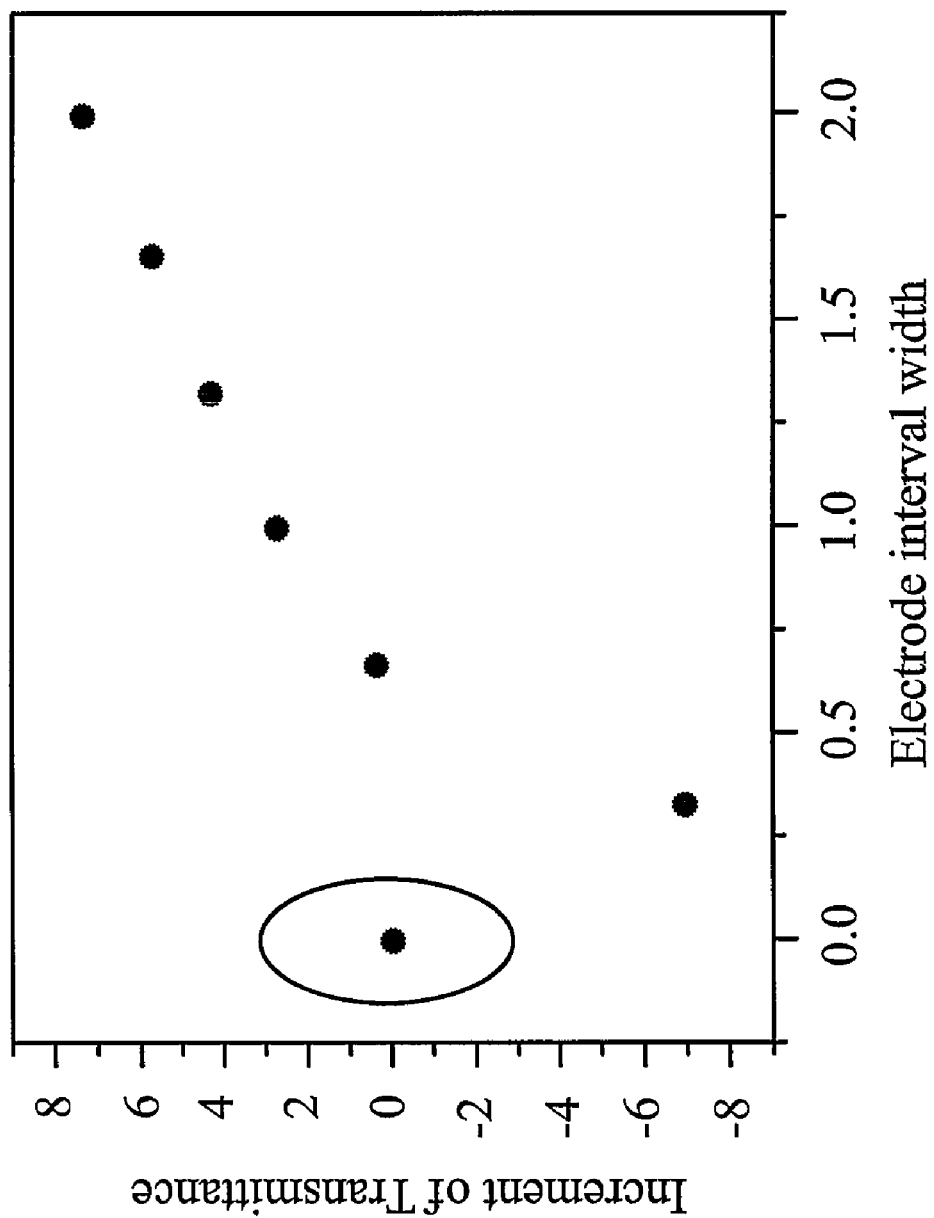
FIG. 6B shows the relationship between increment of transmittance and the line width, the stripe pixel electrode and the interval of the stripe pixel electrode.

FIG. 6A is a diagram illustrating transmission comparison between a conventional OCB-LCD structure and an embodiment of the OCB-LCD structure of the invention. It can be seen that the line width, the stripe pixel electrode and the interval of the stripe pixel electrode affect transmission of the OCB-LCD structure at both the bright state and dark state. Note that, a discontinuous electrical field was generated at the fringe of the first pixel electrode resulting in a locally high transparency region, and a discontinuous electrical field was generated at the fringe of the second pixel electrode resulting in a locally high transparency region. The relationship between increment of transmittance and the line width, the stripe pixel electrode and the interval of the stripe pixel electrode is shown in FIG. 6B.

Figure 7A:
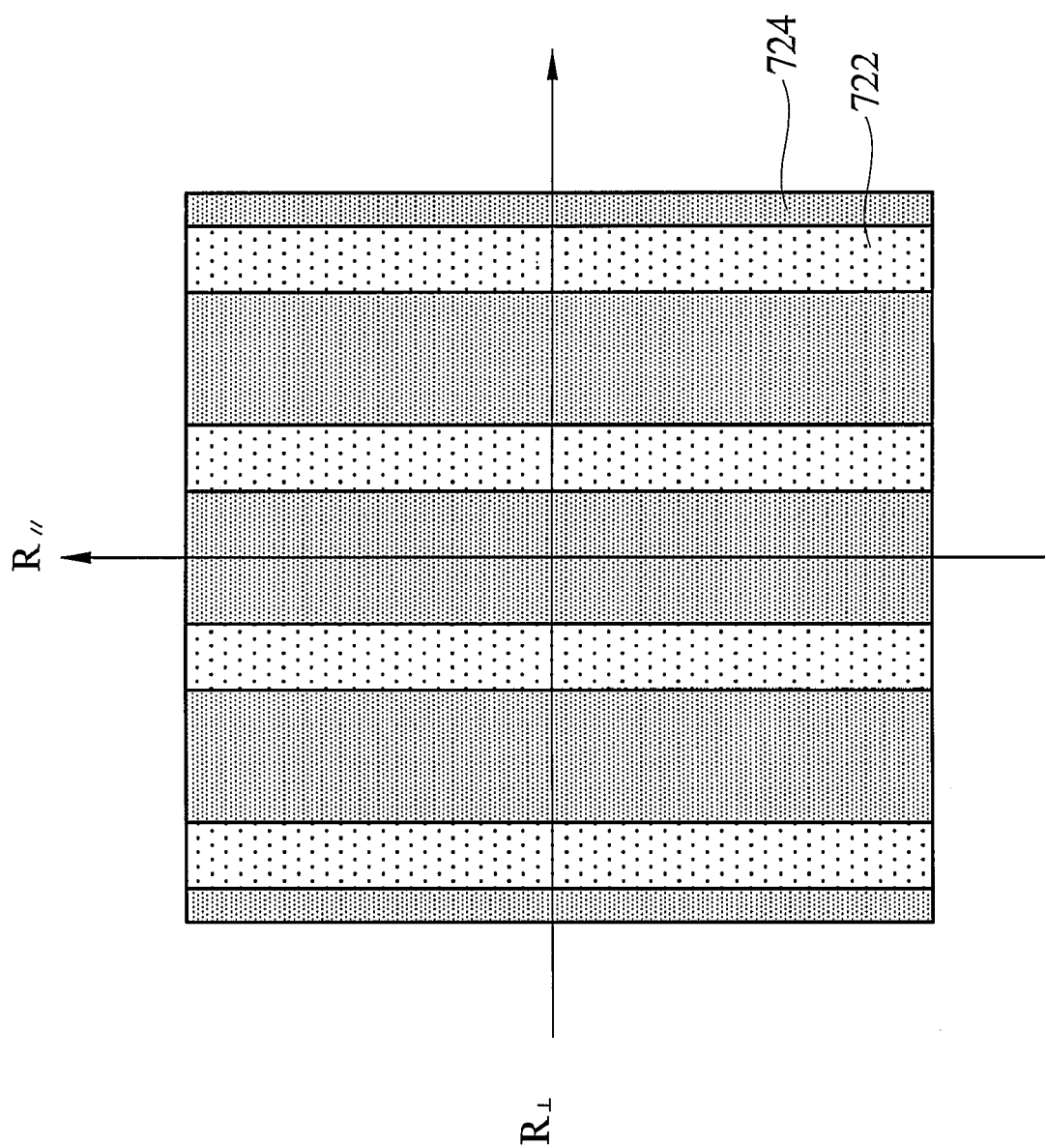
FIG. 7A is a schematic view showing an included angle between a rubbing oriented direction and the first pixel electrode and stripe second pixel electrodes.
Figure 7B:
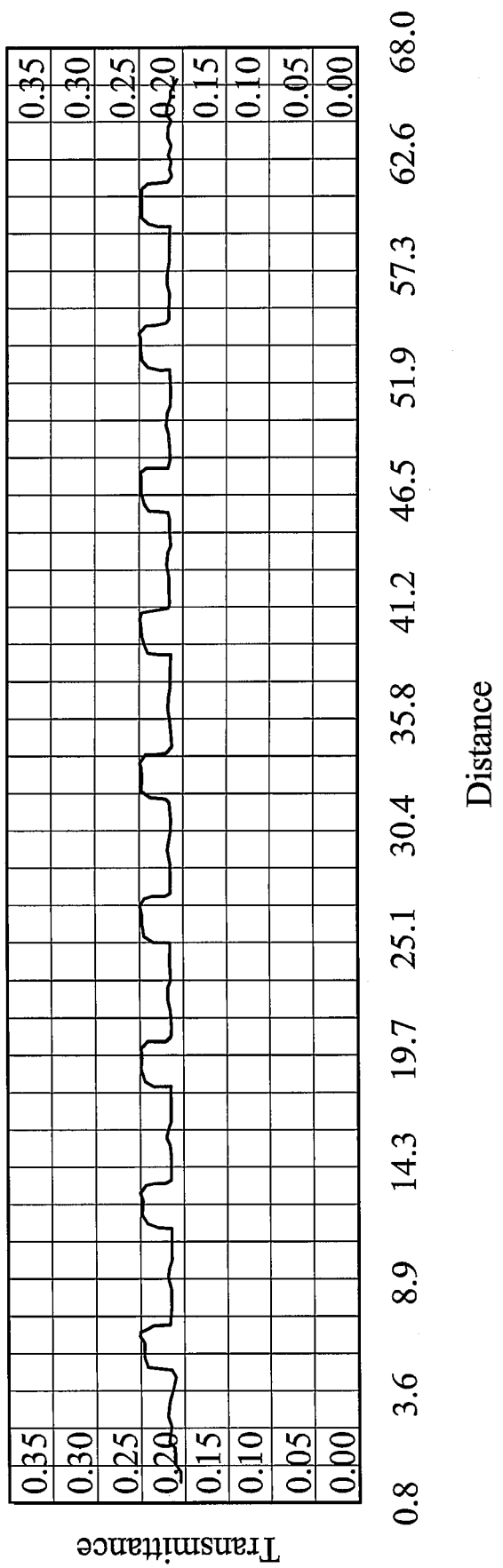
FIG. 7B shows transmittance of the OCB-LCD device along the stripe pixel electrodes under a condition $R_{//}$.
Figure 7C:
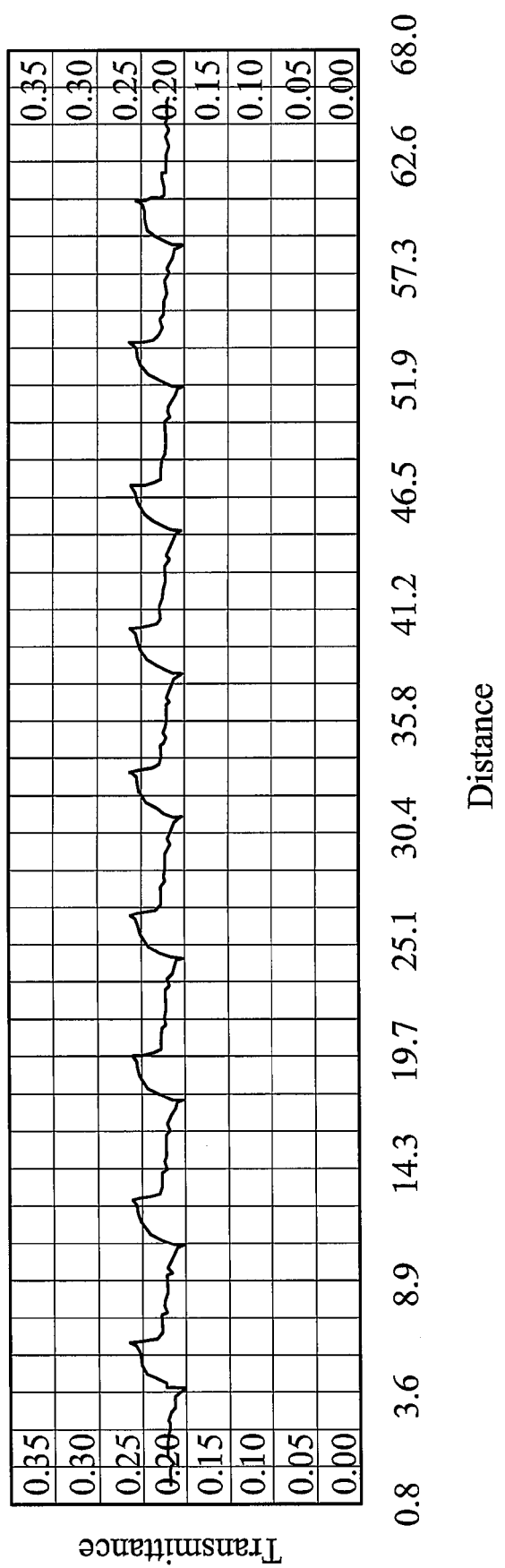
FIG. 7C shows transmittance of the OCB-LCD device along the stripe pixel electrodes under a condition $R_\perp$.

Another aspect of the invention provides different rubbing oriented directions exerting influence on the transmittance of the OCB-LCD device. FIG. 7A is a schematic view showing an included angle between a rubbing oriented direction and the first pixel electrode 724 and striped second pixel electrodes 722. $R_\perp$ indicates that the rubbing oriented direction and the stripe second pixel electrodes 722 are substantially perpendicular to each other. Conversely, $R_{//}$ indicates that the rubbing oriented direction and the stripe second pixel electrodes 722 are substantially parallel. The liquid crystal of the OCB-LCD was selected from a commercially available model (MJ-05128). The pre-tilt angle of the liquid crystal layer was controlled at about 2.5°, and the gap of the liquid crystal layer was about 3.6 μm. Under a condition $R_{//}$, the transmittance of the OCB-LCD device along the stripe pixel electrodes is shown in FIG. 7B. Further, under a condition $R_\perp$, the transmittance of the OCB-LCD device along the stripe pixel electrodes is shown in FIG. 7C.

Accordingly, as a key feature and main aspect of the invention, a rubbing oriented condition can effectively define inclination of the LC molecules, thereby facilitating alignments of the LC molecules during operation. When comparing positive versus negative LC materials, positive LC materials have lower viscosity and greater dielectric anisotropic, thus effectively reduces response time versus negative LC materials.

Figure 8:
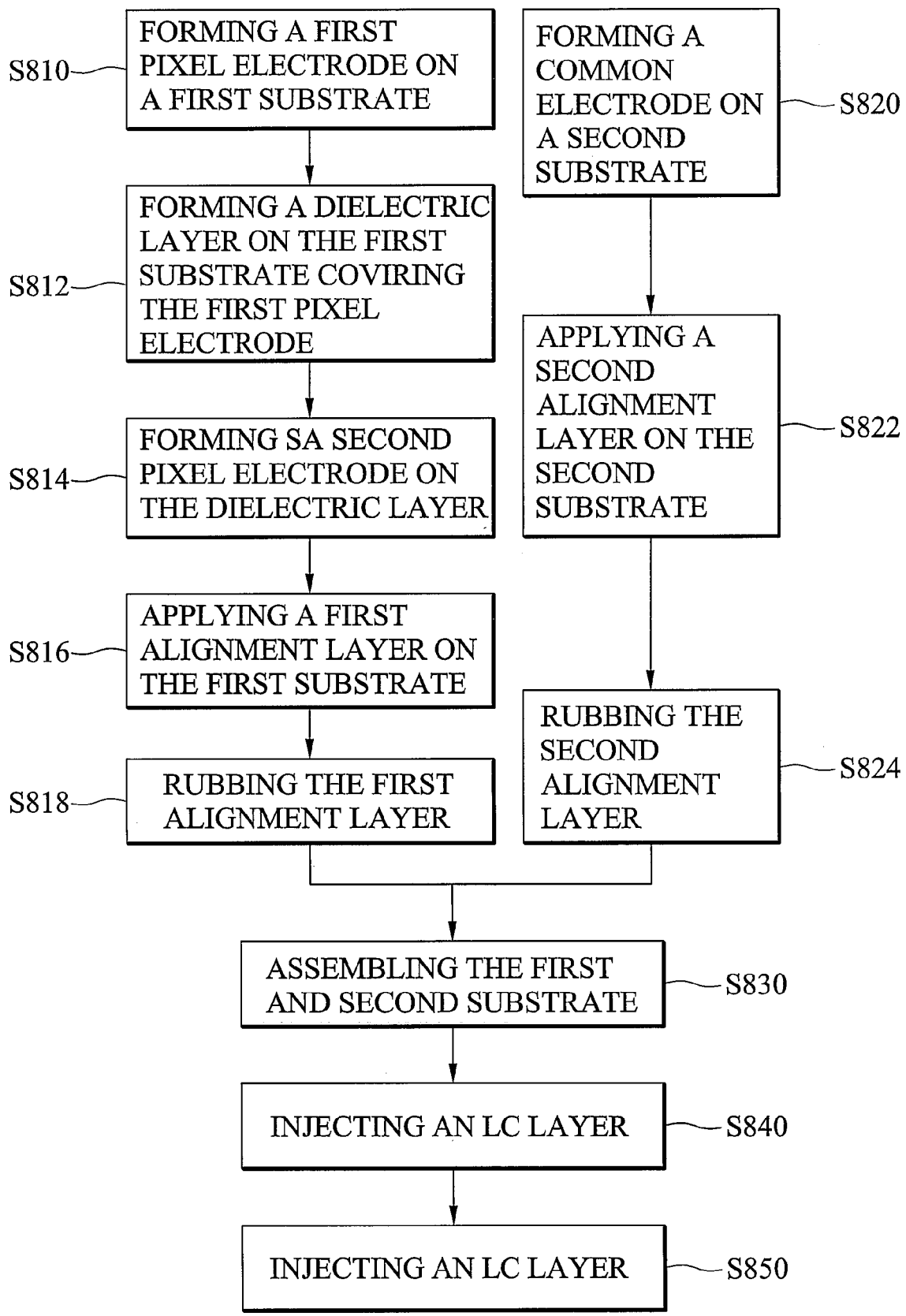
FIG. 8 is a flowchart of an embodiment of a fabrication method for an OCB-LCD device.

Another aspect of the invention provides fabrication methods for an OCB-LCD device. FIG. 8 is a flowchart of an embodiment of a fabrication method for an OCB-LCD device. In FIG. 8, the steps of forming the first substrate structure include forming a first pixel electrode on a first substrate (S810), forming a dielectric layer on the first substrate (S812) covering the first pixel electrode, forming a plurality of second pixel electrodes on the dielectric layer (S814), wherein each second pixel electrode being separated with a gap, thereby creating a discontinuous electric field, applying a first alignment layer on the first substrate (S818) covering the first and second pixel electrodes, and rubbing the first alignment layer (S818). Note the dielectric layer is not an essential element. Therefore, in an embodiment of the invention, the dielectric layer can optionally be formed between the first and the second pixel electrodes as shown in FIG. 3A, while in other embodiments of the invention, there is no dielectric layer between the first and the second pixel electrodes, as shown in FIGS. 3B and 3C.

The steps of forming the second substrate structure include forming common electrodes on the second substrate (S820), forming a second alignment layer on the second substrate (S822) covering the common electrodes, and rubbing the first alignment layer (S824). The included angle between alignment orientations of the first and second substrates respectively can be 0° or less than 20°. The first and second substrates are then assembled (S830), and a liquid crystal layer is filled therebetween (S840). Next, the liquid crystal layer is sealed, thus completing fabrication of the OCB-LCD device. There are additional steps that are required to complete the OCB-LCD device which not mentioned herein, but details have been omitted as the steps are not essential to the understanding of the invention.

While the invention has been described by way of example and in terms of the embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optically compensated bend (OCB) mode liquid crystal display device, comprising:
   a first substrate opposite a second substrate with a layer of liquid crystal molecules interposed therebetween;
   a first pixel electrode disposed on the first substrate;
   a second pixel electrode overlying the first pixel electrode such that a discontinuous electrical field region is generated at the fringe of the second pixel electrode;
   a first alignment layer disposed on the first substrate covering the first and the second pixel electrodes;
   a common electrode disposed on the second substrate; and
   a second alignment layer disposed on the second substrate covering the common electrode.

2. The OCB mode liquid crystal display device as claimed in claim 1, wherein when a voltage is applied to the OCB mode liquid crystal display device, the discontinuous electrical field region has a splay-to-bend mode transition boundary.

3. The OCB mode liquid crystal display device as claimed in claim 1, wherein the first substrate is an active matrix array substrate.

4. The OCB mode liquid crystal display device as claimed in claim 1, further comprising a dielectric layer interposed between the first pixel electrode and second the second pixel electrode.

5. The OCB mode liquid crystal display device as claimed in claim 1, wherein the shape of the second electrode comprises a striped, square, zigzagged, serpentine, polygonal, or circular.

6. The OCB mode liquid crystal display device as claimed in claim 1, wherein the covered region of the common electrode is greater than or equal to the first pixel electrode.

7. The OCB mode liquid crystal display device as claimed in claim 1, wherein the shape of the common electrode comprises a striped, square, zigzagged, serpentine, polygonal, or circular.

8. The OCB mode liquid crystal display device as claimed in claim 1, wherein a discontinuous electrical field is generated at the fringe of the first pixel electrode resulting in a locally high transparency region.

9. The OCB mode liquid crystal display device as claimed in claim 1, wherein a discontinuous electrical field is generated at the fringe of the second pixel electrode resulting in a locally high transparency region.

10. The OCB mode liquid crystal display device as claimed in claim 1, wherein the first alignment layer and the second alignment layer are rubbed along a rubbing oriented direction.

11. The OCB mode liquid crystal display device as claimed in claim 10, wherein the rubbing oriented direction is substantially unparallel or perpendicular to the second pixel electrode or the common electrode.

12. A method for fabricating an optically compensated bend (OCB) mode liquid crystal display device, comprising:
   forming a first pixel electrode on a first substrate;
   forming a second pixel electrode overlying the first pixel electrode such that a discontinuous electrical field region is generated at the fringe of the second pixel electrode;
   forming a first alignment layer on the first substrate covering the first and the second pixel electrodes;
   forming a common electrode disposed on the second substrate;
   forming a second alignment layer disposed on the second substrate covering the common electrode;
   assembling the first and the second substrates;
   filling a liquid crystal layer between the first and the second substrates; and
   sealing the liquid crystal layer.

13. The method as claimed in claim 12, wherein the first substrate is an active matrix array substrate.

14. The method as claimed in claim 12, wherein the first substrate is a color filter substrate comprising a plurality of color filter structures and a black matrix among the plurality of color filter structures.

15. The method as claimed in claim 12, wherein the shape of the second pixel electrode comprises a striped, square, zigzagged, serpentine, polygonal, or circular.

16. The method as claimed in claim 12, wherein a covering region of the common electrode is greater than or equal to the second pixel electrode.

17. The method as claimed in claim 12, wherein the shape of the common electrode comprises a striped, square, zigzagged, serpentine, polygonal, or circular.

18. The method as claimed in claim 12, further comprising rubbing the first alignment layer and the second alignment layer along a rubbing oriented direction.

19. The method as claimed in claim 18, wherein the rubbing oriented direction is substantially unparallel to the second pixel electrode or the common electrode.

20. The method as claimed in claim 18, wherein the rubbing oriented direction is substantially perpendicular to the second pixel electrode or the common electrode.

21. The method as claimed in claim 18, wherein an included angle between the rubbing oriented direction and the second pixel electrode is between about 80° to 100°, or wherein an included angle between the rubbing oriented direction and the common electrode is between about 80° to 100°.

22. The method as claimed in claim 12, further comprising forming a dielectric layer on the first pixel electrode.

* * * * *